United States Patent [19]

Clifford

[11] Patent Number: 5,304,516
[45] Date of Patent: Apr. 19, 1994

[54] GLAZE COMPOSITIONS

[75] Inventor: John F. Clifford, Sydenham, United Kingdom

[73] Assignee: Cookson Group PLC, London, England

[21] Appl. No.: 869,299

[22] Filed: Apr. 16, 1992

[30] Foreign Application Priority Data

Apr. 17, 1991 [GB] United Kingdom ............... 9108257

[51] Int. Cl.$^5$ .................... C03C 8/00; C03C 8/02; C03C 8/04; C03C 8/08
[52] U.S. Cl. ........................ 501/21; 501/14; 501/24; 501/26; 501/63; 501/66; 501/67
[58] Field of Search ............... 501/66, 67, 21, 26, 501/24, 25, 63, 14

[56] References Cited

U.S. PATENT DOCUMENTS

| | | | |
|---|---|---|---|
| 556,727 | 3/1896 | Bagnall | 501/26 |
| 4,590,171 | 5/1986 | Nagrin | 501/25 |
| 5,091,345 | 2/1992 | Becker | 501/21 |
| 5,200,369 | 4/1993 | Clifford | 501/66 |

FOREIGN PATENT DOCUMENTS

| | | | |
|---|---|---|---|
| 2192844 | 9/1986 | European Pat. Off. | C03C 8/4 |
| 267154 | 5/1988 | European Pat. Off. | C03C 8/4 |
| 122937 | 5/1989 | European Pat. Off. | C03C 8/6 |
| 452065 | 10/1991 | European Pat. Off. | |
| 2495190 | 6/1982 | France | |
| 2-86937 | 11/1989 | Japan | C03C 8/2 |

OTHER PUBLICATIONS

Chemical Abstracts, vol. 114, No. 8, Apr. 8, 1991 (JP 2-208236).

Primary Examiner—Mark L. Bell
Assistant Examiner—C. M. Bonner
Attorney, Agent, or Firm—Watson, Cole, Grindle & Watson

[57] ABSTRACT

Glaze composition comprises 45 to 75% of $SiO_2$, 0.1 to below 5% of $Bi_2O_3$, 0.1 to 20% of $Al_2O_3$ to 20% of $B_2O_3$, at least one of CaO, MgO, SrO, BaO or ZnO in an amount of 2 to 22%, at least one of $Li_2O$, $Na_2O$, $K_2O$ in an amount of 1 to 10%, at least one of $La_2O_3$, $MoO_3$ or $WO_3$ in an amount of 0.1 to 10% and certain other optional ingredients, all percentages being percentages by weight based on the total weight of the glaze composition, the glaze composition having a firing temperature of 950° to 1250° C., and having a coefficient of thermal expansion of 50 to $100 \times 10^{-7}$/°C.

14 Claims, No Drawings

GLAZE COMPOSITIONS

The present invention relates glaze compositions and, in particular, to glaze compositions which are substantially free of lead and cadmium and other toxic heavy metal.

For several reasons the development of lead free glazes with the appropriate properties to match the properties of the ceramic ware to which they are to be applied is a very desirable commercial goal. First, occasional episodes of lead poisoning have resulted from the use of improperly formulated and fired lead-containing glazes on ceramic ware. Whilst lead-containing glazes can be prepared which are safe and meet current requirements for permissible lead release to food with which they come into contact, the problem of lead poisoning is avoided if lead is avoided. In addition, various pollution controls regarding the use of lead and limits on the content of lead in waste water can be avoided by the use of lead-free glazes.

In the ceramic art a glaze is typically defined as a transparent or opaque glassy coating fired onto a ceramic article or a mixture of ingredients from which the coating is made. Glazes are of two main types, "raw" or "fritted".

"Raw" glazes are typically composed of a mixture of finely ground insoluble beneficiated natural materials—minerals and rocks such as china clay and nepheline syenite. Raw glazes are typically used at high firing temperatures (>1150° C.) on substrates such as porcelain (1300° C.)

"Fritted" glazes are those where all or part of the ingredients have been prefused and quenched to form one or more frits. The frits are ground and mixed with other constituents (natural materials such as china clay) to formulate the final glaze composition.

Fritting is usually carried out, amongst other reasons, in order to improve homogeneity and to render water soluble or toxic constituents insoluble. Fmitted glazes are currently usually used for ceramic ware fired below 1150° C.

The compositions herein described apply to the final composition of the glaze coating, the constituents from which they are formed being partly a matter of availability, economics and choice. It is envisaged that the glaze formulations of the present invention will be utilized as fritted glazes, but this is not necessarily always obligatory.

The composition of the glaze is chosen to ensure certain well defined properties such as adhesion to the substrate, a thermal expansion which matches that of the substrate, transparency or opacity, surface finish and texture, and resistance to chemical attack.

Ceramic ware falls into a variety of different categories (Table 1), each with its own characteristic mix of thermal and mechanical properties.

TABLE 1

Practical Glaze Body Systems

| Body | Biscuit fire (°C.) | Glaze | Glaze firing temperature (°C.) | Typical glaze thermal expansion coefficients $\times 10^{-7}$ °C.$^{-1}$ |
|---|---|---|---|---|
| "Continental" porcelain | 1000 | Clear, lead free, no frit | 1350–1400 | 50 |
| Bone China | 1235 | Clear, medium lead or sometimes lead free, high frit content. | 1020–1100 | 85–100 |
| Vitreous hotel ware | 1250 | Clear, low lead, high frit content | 1050 | 60–70 |
| Vitreous sanitary ware | Single Fire | Opaque, lead free, little or no frit. Often coloured. | 1250 | 60–70 |
| Stoneware | 1000 Single-fire | Various, lead free. No frit | 1230 | 65 |
| Semi-vitreous ware | 1250 | Clear, low lead or lead free. High rit content. | 1050 | 70 |
| Wall tile | 1100 | Various, high lead to lead free. High frit content. Often textured. | 980–1060 | 70–80 |
| Floor tile | 1180 | Some glazed, therefore nonslip abrasion-resistant glaze or engobe needed. | 1000–1100 | 60–70 |
| Earthenware | 1100–1150 | All types, containing frit | 980–1080 | 70–80 |
| Brick | 950–1120 single-fire | All types, containing frit | 950–1120 | 55–75 |

Consequently, before one considers any additional requirements such as appearance or durability, thermomechanical characteristics (glaze maturation temperature and thermal expansion) alone dictates that one glaze will not suffice for all substrates. Each type of substrate requires its own type of glaze.

Furthermore, glaze formulations are frequently tailored not only to match a given type of ceramic ware but also the precise conditions under which it will be fired. The glaze will often have been formulated and modified to yield ware of the desired appearance and appropriate physical properties when fired over a specific schedule in a known kiln. It is not uncommon in the ceramics industry to find glazes which are not only unique to a specific manufacturer, but also unique to one of his production kilns. Hence, the ceramics industry uses and has need of a very wide range of glaze formulations.

A durable lead free low melting, low viscosity high refractive index glaze adaptable to a wide range of firing conditions, so characteristic of lead based glazes, has long been sought by the ceramics industry.

The problem has been in finding high refractive index, low melting glazes ($\leq 1150°$ C.), without the use of toxic heavy metals such as Pb, Cd or Ba. While elements such as Zr, Ti, La, etc. can be added to increase the refractive index, the accompanying increase in melting temperature or tendency for devitrification has been too great.

In copending European Patent Application No. 91303072.2 I describe a low melting high refractive index/gloss glaze for bone china based on bismuth which solves this problem. Glazes of that invention work well for bone and fine china. The restricted supply and relatively high cost of bismuth however, precludes the use of high bismuth content glazes on a wide spread basis. Such glazes are generally only cost effective on high quality items such as bone china—where top quality is a prerequisite.

A low cost alternative with a wider applicability is required for general useage on white ware. I have found that low bismuth content glazes augumented with a blend of one or more of the elements La, W or Mo can be made to meet this requirement. The glazes of the present invention can be formulated to provide high gloss glazes with thermal expansions and firing temperatures compatible with a wide range of ceramic substrates, including bone or fine china, vitreous or hotel ware and earthenware.

Various lead-free glazes have been described in the art and specific mention may be made of the following prior art.

U.S. Pat. No 4,285,731 discloses frit compositions which are substantially free of lead and cadmium, the frits consisted essentially, in weight percent on the oxide basis, of:

| | |
|---|---|
| $SiO_2$ | 35 to 47 |
| $B_2O_3$ | 5.5 to 9 |
| BaO | 24 to 42 |
| $TiO_2$ | 1.5 to 4 |
| $ZrO_2$ | 6 to 10 |
| $Li_2O$ | 1 to 5 |
| SrO | 0 to 8 |
| MgO | 0 to 5 |
| CaO | 0 to 5 |
| ZnO | 1 to 10 |
| $Bi_2O_3$ | 0 to 8 |
| SrO + MgO + CaO + ZnO + $Bi_2O_3$ | 0 to 10 |

The above frits exhibited a coefficient of thermal expansion between about 65 to $75 \times 10^{-7}/°C.$, a viscosity suitable for firing at about 700° to 950° C., and excellent resistance to attach by acids and bases.

U.S. Pat. No. 4,282,035 also describes lead and cadmium-free frits, those frits exhibiting coefficients of thermal expansion between about 52 to $65 \times 10^{-7}/°C.$, maturing temperatures of about 850° to 1100° C., excellent resistance to attack by acids and alkalis, and consisting essentially, in weight on the oxide basis, of:

| | |
|---|---|
| $SiO_2$ | 51 to 60 |
| $B_2O_3$ | 4.5 to 8 |
| BaO | 0 to 13 |
| SrO | 0 to 18 |
| BaO + SrO | 6 to 30 |
| $ZrO_2$ | 4 to 8 |
| $Al_2O_3$ | 5 to 8 |
| $Li_2O$ | 0 to 4 |
| $Na_2O$ | 0 to 5 |
| $K_2O$ | 0 to 5 |
| $Li_2O$ + $Na_2O$ + $K_2O$ | 1 to 5 |
| MgO | 0 to 6 |
| CaO | 0 to 12 |
| $Bi_2O_3$ | 0 to 10 |
| MgO + CaO + $Bi_2O_3$ | 0 to 20 |

U.S. Pat. No 4,555,258 describes lead, cadmium and arsenic free glass frit compositions which consist essentially of $Bi_2O_3$, $B_2O_3$, $SiO_2$ with $R_2O$ being 2 to 8% and RO being 0 to 9% by weight.

U.S. Pat. No. 4,590,171 also describes lead and cadmium free frits consisting essentially, in weight percent on the oxide basis of

| | |
|---|---|
| $Li_2O$ | 3 to 4 |
| $Na_2O$ | 0.75 to 3 |
| BaO | 3.5 to 9.5 |
| $B_2O_3$ | 14 to 17.5 |
| $Al_2O_3$ | 6.75 to 8.75 |
| $SiO_2$ | 48 to 55 |
| $ZrO_2$ | 6.75 to 10.5 |
| F | 3 to 4 |

Finally, U.S. Pat. No 4,892,847 discloses lead free glass frit compositions consisting essentially of $SiO_2$, $Bi_2O_3$, $B_2O_3$, alkali metal oxide and $ZrO_2/TiO_2$ in appropriate concentrations.

There are four essential criteria which must be demonstrated by glazes, and a fifth characteristic which is essential when a high gloss glaze is required.

First, the firing or glazing temperature of the glaze must not exceed the temperature at which the ceramic body being coated thermally deforms.

Second, the coefficient of thermal expansion of the glaze must be compatible with that of the ceramic body being coated to preclude crazing and/or spalling; the glaze preferably having coefficients of thermal expansion somewhat lower than that of the substrate such that, when the ceramic body is cooled the fired coating will form a surface compression layer.

Third, the glaze must possess excellent resistance to attack by acids and bases since corrosion of the coating can result in the loss of gloss, the development of haze and/or iridescence, the formation of porosity, or other defects deleterious to the appearance or physical character of the coating.

Fourth, in the case of transparent glazes, the glaze must maintain good glass stability and must not devitrify to any substantial extent during the firing. Fifth, where a glossy appearance is desired, the refractive index of the glaze must be high.

I have now developed a lead-free glaze compositions which can be applied to a wide range of ceramic substrates including bone or fine china, vitreous ware and earthenware.

Accordingly, the present invention provides a glaze composition which is essentially free from lead and cadmium and which comprises the following components:

| | |
|---|---|
| $SiO_2$ | 45 to 75% |
| $Bi_2O_3$ | 0.1 to below 5% |
| $Al_2O_3$ | 0.1 to 20% |
| $B_2O_3$ | 2 to 20% |
| at least one of CaO, MgO, SrO, BaO or ZnO | 2 to 22% |
| at least one of $Li_2O$, $Na_2O$, $K_2O$ | 1 to 10% |
| at least one of $La_2O_3$, $MoO_3$, $WO_3$ | 0.1 to 10% |
| $TiO_2$ | 0 to 10% |
| $ZrO_2$ | 0 to 10% |
| $P_2O_5$ | 0 to 5% |
| $V_2O_5$ | 0 to 1% |
| fluoride ions | 0 to 5% | all percentages being percentages by weight based on the total weight of the glaze composition, the glaze composition containing $La_2O_3$, $MoO_3$ and/or $WO_3$ in a total amount of less than 10% by weight, with the proviso that the amount of each of $WO_3$ and $MoO_3$ is less than 5% by weight, and with the proviso that BaO is not contained is an amount of more than 24 by weight, the glaze composition having a firing temperature of 950° to 1250° C., and having a coefficient of thermal expansion of 50 to 100× $10^{-7}$/°C.

The glaze compositions of the present invention preferably comprise from 1.0 to 4.5% by weight of $Bi_2O_3$, more preferably 2.0 to 4.0% by weight of $Bi_2O_3$, from 50 to 65% by weight Of $SiO_2$, from 7 to 15% by weight of $Al_2O_3$, more preferably from 8 to 14% by weight of $Al_2O_3$, and from 5 to 14% by weight of $B_2O_3$, more preferably from 7 to 12% by weight of $B_2O_3$.

The glaze compositions of the present invention contain at least one of $La_2O_3$, $MoO_3$ or $WO_3$ in the amounts as specified above. When the additive is $MoO_3$, it is preferably used in an amount of less than 2% by weight, preferably less than 1% by weight, as amounts above 2% by weight will tend to render the glazes opaque. When the additive is $WO_3$, it is preferably used in an amount of less than 2% by weight, preferably less than 1% by weight, as amounts above 2% by weight will tend to render the glazes opaque. When the additive is $La_2O_3$ it is preferably used in an amount of less than 5% by weight. The total amount of $La_2O_3$, it is $WO_3$ is preferably 0.1 to 8.0% and more preferably in the range of from 0.5 to 5.0% by weight.

Due primarily to the use of $MoO_3$ and $WO_3$, many of the glaze formulations of the invention have an increased tendency towards liquid immiscibility, which can result in opalescence or opacity.

Hence, when a transparent glaze is required, appropriate and standard steps within the scope of the present invention can be taken to minimize this. It is, for example, known in the art that increasing amounts Of $MoO_3$ and $WO_3$ promote immiscibility, as can $P_2O_5$, whereas $Al_2O_3$ suppresses it.

In general, the trend is that the higher the Ionic Field Strength (Z/r) of an ion the more likely it is to promote immiscibility. Hence, such elements ought to be minimized to an optimum level. Lithium, for example, is more likely to induce liquid immiscibility than are Na or K and so should not be used in excess.

It has also been found that some formulations are sensitive to the precise firing conditions. In general, higher temperatures and faster cooling inhibit liquid immiscibility and result in clear glazes. This in fact makes such glazes well suited to the fast fire schedules now being introduced into the tableware industry.

As is general practice, the precise formulations of the glazes of the present invention should be precisely matched not only to the intended substrates but also to the kiln firing cycles (and atmospheres) to be used in order to obtain the desired appearance.

In order to provide a high gloss the glaze of the present invention should preferably have a refractive index of at least 1.45.

The glass frits which may be used to form the glazes of the present invention can be prepared by mixing together the oxide producing materials, charging the mixture of materials into a glass melting furnace at a temperature sufficiently high to produce the fused glass and then fritting the glass by pouring it into water, or by passing it through water cooled rolls. It may be preferred to carry out the fritting operation in an oxidizing atmosphere, or to include an oxygen rich component in the mixture which is melted and fused. The frit may be ground into a powder by conventional grinding techniques.

Though methods exist for applying glazes in dry or even molten form, the conventional method of application for bone china is in the form of a fine ground water based slurry or slip with the item being coated by either dipping or spraying. This glaze slip might consist, in addition to the carrier medium-water, exclusively of a single ground frit, or a mixture of many materials including frits, minerals, insoluble manufactured chemicals as well as minor quantities of rheological modifying agents. These latter constituents may include such things as flocculants, deflocculants, binders, wetting agents, antifoaming agents and for identification purposes even organic dyes. The glaze may optionally contain one or more pigments.

The mode of application of the glaze to the ceramic article is not seen as central to this invention—any feasible method is permissible.

The precise blend and form of the constituents from which the final glaze is formed may be changed without substantially departing from the invention intended to be defined herein. The description being merely illustrative of embodiments of the principle of the invention and not limiting it.

The glazes of the present invention can be formulated to have a glazing or glost temperature in the range of from 950° to 1250° C. in order to make them suitable for use with bone or fine china vitreous ware and earthenware. By the term "glazing temperature" as used herein is meant a temperature at which the glaze melts and flows sufficiently to produce a smooth uniform homogeneous coating on the ceramic body being coated therewith. The glazing temperature is also sometimes referred to as the firing or glost temperature.

The glazes of the present invention comprise at least one of Cao, Mgo, Sro, BaO or Zno in an amount of from 2 to 22% by weight, in total. Mixtures of these oxides may advantageously be used. Barium is preferably absent but if used the amount of BaO is the glazes of the present invention is kept below 2% by weight in view of its toxicity. The glazes of the present invention also comprise at least one of $Li_2O$, $Na_2O$ or $K_2O$ in an amount of from 1 to 10% by weight, in total. The amount of $Li_2O$ is preferably less than 4% by weight. When ZnO is used in the glazes of the present invention it is preferably used in an amount of below 2% by weight.

The glazes of the present invention may also comprise the various optional ingredients listed above. Additions of $ZrO_2$ and/or $TiO_2$ are beneficial since $ZrO_2$ will improve the resistance of the glaze to alkali and detergent solution attack, whilst the addition of $TiO_2$ will improve the resistance of the glass to acid attack. The total addition of $ZrO_2$ and/or $TiO_2$ is preferably less than 4% by weight.

The present invention also includes within its scope a method of glazing a ceramic body, which method comprises coating a ceramic body with a glaze composition as hereinbefore described and firing the coated ceramic body at a temperature of 950° to 1250° C.

Preferably, the ceramic body coated according to the method of the invention is vitreous ware or earthenware.

The present invention will be further described with reference to the following Examples.

EXAMPLES 1 and 2

The glazes of Examples 1 and 2 were prepared by the following general procedure.

A glass of the appropriate composition was melted at approximately 1300° C., frit quenched, ground to a powder and the mixed with 12% china clay by ball milling in water to produce a glaze slip which, on firing, yielded a glaze composition as given in Table 2.

Both trials followed the same procedure. After coating the test piece (bone china plate) with the glaze slip and drying, they were fired by heating at 5.90° C./min to 1100° C., held for 45 minutes and cooled at 5.90° C./min to room temperature. A glossy glaze was obtained.

TABLE 2

|  | 1 | 2 |
|---|---|---|
| $SiO_2$ | 59.61 | 56.92 |
| $Al_2O_3$ | 9.92 | 9.47 |
| CaO | 12.37 | 6.42 |
| SrO | 0.99 | 12.10 |
| $K_2O$ | 2.25 | 3.26 |
| $Na_2O$ | 2.97 | 0.51 |
| $Li_2O$ | — | 0.12 |
| $B_2O_3$ | 4.94 | 5.82 |
| $La_2O_3$ | 2.98 | 1.00 |
| $Bi_2O_3$ | 2.98 | 1.98 |
| $MoO_3$ | — | 0.40 |
| $WO_3$ | 0.99 | 1.00 |
| $ZrO_2$ | — | 1.00 |

EXAMPLES 3 to 88

The glazes of these Examples were prepared by the following general procedure.

The components were mixed in a mortar and pestle and fused at 13500° C. for 1¼ hours in a platinum crucible. The glass produced was quenched and the frit initially hand ground, followed by ball milling in water for 4 hours in a ceramic pot with an $Al_2O_3$ milling medium (average particle size of final milled frit was approximately 6 micrometers). The slurry was dried and then 12% china clay added with a further 15 minute milling period to yield a glaze slip which on firing gave the compositions as detailed in Table 3 below.

Approximately 8g of the glaze was sprayed onto the chosen ceramic substrate or substrates selected from 6 inch diameter bone china plates, earthenware plates or hotel ware plates and then fired as described below.

The earthenware and hotel ware plates were glost fired employing a ramp rate of 30° C. per minute to 1100° C., a 2 hour holding time and a cooling rate of 50° C. per minute. A variation was made for firing onto bone china plates when the holding temperature was 1080° C. for 2 hours.

The glazes were fired onto the following substrates and in all cases produced a good gloss.

| Bone China only | Examples 3 to 5. |
|---|---|
| Bone China and earthenware | Examples 6 to 8. |
| Earthenware only | Examples 9 to 23, 34 to 36, 40, 44, 45, 47, 48, 50, 68, 70 to 76. |
| Hotel ware only | Examples 24 to 33, 42, 43, 56, 58, 62, 63, 66, 67, 83 to 88. |
| Earthenware and Hotel ware | Examples 37 to 39, 41, 46, 49, 51 to 55, 57, 59 to 61, 64 and 65. |

The glazes were also tested by means of 'Flow Trials'. This is a standard test used in the industry to give a measure of the melting and flow (viscosity) characteristics of a glaze the appearance of which also gives a preliminary indication of glaze stability (tendency for crystallization and phase immiscibility).

For the flow trials, 1.5 gm of glaze powder was dry pressed into a disc and placed in a circular slot at the mouth of a flow channel in a flow trial slab. The slab was mounted at an angle of 33 degrees and fired at a ramp rate of 30° C. per minute to 1100° C., with a 2 hour holding time and a cooling rate of 50° C. per minute.

In the Examples given in Table 3 the following abbreviations are given for the appearance of the glaze in the flow trial:

```
O.W. = opaque white
OP   = opal
S.O. = slight opalescence
V.S. = very slight opalescence
T    = transparent
```

Some flow trials were also performed at 1200° C. using the same ramp rates but a shorter holding time of 1 hour.

At this higher temperature the following abbreviations were used.

```
* = transparent
o = very slight opalescence
```

Some flow trials were also performed at 1130° C. with a ramp rate of 90° C. per minute to 1130° C., a 45 minute holding time and a cooling rate of 90° C. per minute to mimic a 'fast fire' schedule. At this temperature the following abbreviation was used.

```
Δ = transparent
```

TABLE 3

| Example No. | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|
| $SiO_2$ | 57.14 | 60.76 | 60.76 | 58.0 | 58.75 | 56.75 | 57.42 | 59.25 | 59.25 | 53.25 | 55.25 | 51.26 | 56.25 | 56.25 | 60.26 | 60.26 |
| $Al_2O_3$ | 5.66 | 6.22 | 6.22 | 10.58 | 11.33 | 11.33 | 10.47 | 11.33 | 11.33 | 11.33 | 11.33 | 11.33 | 11.33 | 11.33 | 11.33 | 11.33 |
| $B_2O_3$ | 6.52 | 5.58 | 5.58 | 11.22 | 13.72 | 11.22 | 11.10 | 13.22 | 13.22 | 13.22 | 11.22 | 9.22 | 11.22 | 11.22 | 9.22 | 9.22 |
| CaO | 7.18 | 13.88 | 13.88 | 6.12 | 2.12 | 6.12 | 6.06 | 7.12 | 7.12 | 7.12 | 7.12 | 7.12 | 7.12 | 7.12 | 7.12 | 7.12 |
| $Na_2O$ | 0.56 | 3.36 | 3.36 | 5.08 | 4.08 | 5.08 | 5.03 | 4.08 | 2.08 | 4.08 | 4.08 | 4.08 | 4.08 | 4.08 | 4.08 | 4.08 |
| $K_2O$ | 3.44 | 2.32 | 2.32 | 0.50 | 1.00 | 0.50 | 0.50 | 1.00 | 2.00 | 1.00 | 1.00 | 1.00 | 1.00 | 1.00 | 1.00 | 1.00 |
| $Li_2O$ | 0.12 | — | — | 0.50 | 1.00 | 0.50 | 0.50 | 1.00 | 2.00 | 1.00 | 1.00 | 1.00 | 1.00 | 1.00 | 1.00 | 1.00 |
| $Bi_2O_3$ | 2.22 | 3.35 | 1.68 | 3.00 | 0.50 | 3.00 | 2.97 | 1.00 | 1.00 | 1.00 | 3.00 | 4.99 | 3.00 | 3.00 | 4.99 | 4.99 |
| $La_2O_3$ | 1.12 | 3.35 | 1.68 | 3.00 | 1.25 | 3.00 | 2.97 | 1.00 | 1.00 | 5.00 | 3.00 | 5.00 | 5.00 | — | 1.00 | — |
| $WO_3$ | 1.12 | 1.12 | 0.56 | 1.00 | 1.25 | 1.00 | 0.99 | 1.00 | 1.00 | 3.00 | 3.00 | 5.00 | — | 5.00 | — | 1.00 |
| $MoO_3$ | 0.44 | — | — | — | — | 0.50 | — | — | — | — | — | — | — | — | — | — |
| $ZrO_2$ | 1.12 | — | — | — | — | — | — | — | — | — | — | — | — | — | — | — |

TABLE 3-continued

| | | | | | | | | | | | | | | | | |
|---|---|---|---|---|---|---|---|---|---|---|---|---|---|---|---|---|
| ZnO | — | — | — | — | — | — | 1.00 | — | — | — | — | — | — | — | — | — |
| SrO | 13.58 | 0.12 | 0.12 | 1.00 | 5.00 | 1.00 | 0.99 | — | — | — | — | — | — | — | — | — |
| TiO$_2$ | | | | | | | | | | | | | | | | |
| MoO$_3$ | | | | | | | | | | | | | | | | |
| V$_2$O$_3$ | | | | | | | | | | | | | | | | |
| MgO | | | | | | | | | | | | | | | | |
| Appearance in flow trial at 1100° C. | OP* | OW | S.O* | V.S. | OP* | OP* | OP | S.O. | OP | O.W. | O.W. | O.W. | OP | O.W. | T | O.W. |
| Thermal Expansion ($\times 10^{-6}$/°C.) | 8.0 | — | 8.94 | 8.5 | 7.86 | 8.34 | — | 6.0 | 6.17 | 6.87 | 7.13 | 7.9 | 6.13 | 6.63 | 7.00 | 6.80 |

| Example No. | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|
| SiO$_2$ | 59.25 | 58.25 | 57.25 | 57.25 | 60.26 | 60.26 | 63.00 | 62.50 | 59.00 | 63.55 | 63.55 | 63.55 | 63.55 | 64.75 | 64.45 | 63.45 | 63.75 |
| Al$_2$O$_3$ | 11.33 | 11.33 | 11.33 | 11.33 | 11.33 | 11.33 | 11.00 | 11.00 | 12.58 | 11.33 | 11.33 | 11.33 | 11.33 | 11.33 | 11.33 | 11.33 | 11.33 |
| B$_2$O$_3$ | 13.22 | 13.22 | 13.22 | 13.22 | 9.22 | 9.22 | 9.00 | 9.00 | 9.47 | 9.50 | 9.50 | 9.5 | 9.50 | 9.50 | 9.50 | 9.50 | 9.50 |
| CaO | 7.12 | 7.12 | 7.12 | 7.12 | 7.12 | 7.12 | 6.00 | 6.00 | 7.12 | 7.12 | 7.12 | 7.12 | 7.12 | 7.12 | 7.12 | 7.12 | 7.12 |
| Na$_2$O | 4.08 | 4.08 | 4.08 | 4.08 | 1.58 | 1.58 | 3.00 | 3.00 | 4.25 | 2.00 | 2.75 | 2.75 | 0.50 | 2.00 | 2.00 | 4.00 | 2.00 |
| L$_2$O | 1.00 | 1.00 | 1.00 | 1.00 | 4.00 | 4.00 | 2.00 | 2.00 | 2.58 | 2.00 | 2.75 | 0.50 | 2.75 | 2.00 | 2.00 | 0.50 | 2.00 |
| Li$_2$O | 1.00 | 1.00 | 1.00 | 1.00 | 0.50 | 0.50 | 1.50 | 1.50 | 2.00 | 2.00 | 0.50 | 2.75 | 2.75 | 2.00 | 2.00 | 1.50 | 2.00 |
| Bi$_2$O$_3$ | 1.00 | 1.00 | 1.00 | 1.00 | 4.99 | 4.99 | 1.00 | 1.00 | 2.00 | 1.00 | 1.00 | 1.00 | 1.00 | 1.00 | 1.00 | 1.00 | 1.00 |
| La$_2$O$_3$ | — | 1.00 | 1.00 | 1.00 | 1.00 | 1.00 | 1.00 | 1.00 | 1.00 | 0.50 | 0.50 | 0.50 | 0.50 | 0.10 | 0.20 | 0.20 | 0.10 |
| WO$_3$ | 2.00 | 2.00 | 1.00 | 1.00 | — | — | — | — | — | 0.50 | 0.50 | 0.50 | 0.50 | 0.10 | 0.20 | 0.20 | 0.10 |
| MoO$_3$ | — | — | — | — | — | — | — | — | — | 0.50 | 0.50 | 0.50 | 0.50 | 0.10 | 0.20 | 0.20 | 0.10 |
| ZrO$_2$ | — | — | 2.00 | — | — | — | 0.50 | 0.50 | — | — | — | — | — | — | — | 1.00 | 1.00 |
| ZnO | — | — | — | — | — | — | — | — | — | — | — | — | — | — | — | — | — |
| SrO | — | — | — | — | — | — | 2.00 | 2.00 | — | — | — | — | — | — | — | — | — |
| TiO$_2$ | — | — | — | 2.00 | — | — | — | 0.50 | — | — | — | — | — | — | — | — | — |
| MoO$_3$ | | | | | | | | | | | | | | | | | |
| V$_2$O$_3$ | | | | | | | | | | | | | | | | | |
| MgO | | | | | | | | | | | | | | | | | |
| Appearance in flow trial at 1100° C. | O.W. | O.W. | V.S. | OP | S.O. | S.O. | S.O. | T | T | O.W. | O.W. | T | S.O. | S.O. | S.O. | OP | OP |
| Thermal Expansion ($\times 10^{-6}$/°C.) | 6.57 | 6.97 | — | — | 6.80 | 6.91 | 6.69 | 7.00 | — | 6.43 | 7.06 | — | — | 6.6 | 6.37 | — | — |

| Example No. | 36 | 37 | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|---|---|
| SiO$_2$ | 63.00 | 58.75 | 63.00 | 61.50 | 57.45 | 63.75 | 63.00 | 63.00 | 60.88 | 63.75 | 58.25 | 56.25 | 58.25 | 56.25 | 56.25 | 56.25 | 59.26 | 59.25 |
| Al$_2$O$_3$ | 11.00 | 11.33 | 11.00 | 11.00 | 11.33 | 11.33 | 11.00 | 11.00 | 11.00 | 11.33 | 11.33 | 11.33 | 11.33 | 11.33 | 11.33 | 11.33 | 11.33 | 11.33 |
| B$_2$O$_3$ | 9.00 | 14.22 | 9.00 | 9.00 | 13.22 | 9.22 | 9.00 | 9.00 | 9.00 | 9.22 | 9.22 | 11.22 | 11.22 | 9.22 | 11.22 | 11.22 | 8.72 | 10.72 |
| CaO | 6.00 | 7.12 | 6.00 | 8.00 | 9.00 | 7.12 | 6.00 | 6.00 | 7.12 | 7.12 | 7.12 | 7.12 | 7.12 | 7.12 | 7.12 | 7.12 | 7.12 | 7.12 |
| Na$_2$O | 4.00 | 4.08 | 3.00 | 3.00 | 2.00 | 2.08 | 3.00 | 3.00 | 4.00 | 2.08 | 6.08 | 6.08 | 6.08 | 6.08 | 4.08 | 3.08 | 3.08 | 3.08 |
| L$_2$O | 1.00 | 1.00 | 2.00 | 2.00 | 2.00 | 2.00 | 2.00 | 2.00 | 2.00 | 2.00 | — | — | — | — | 1.00 | 2.00 | 2.00 | 2.00 |
| Li$_2$O | 1.50 | 1.00 | 1.50 | 1.50 | 2.00 | 2.00 | 1.50 | 1.50 | 0.50 | 2.00 | — | — | — | — | 1.00 | 1.00 | 1.50 | 1.50 |
| Bi$_2$O$_3$ | 1.00 | 0.50 | 0.50 | 0.50 | 1.00 | 1.00 | 1.00 | 1.00 | 3.00 | 1.00 | 5.00 | 3.00 | 3.00 | 5.00 | 3.00 | 3.00 | 4.99 | 3.00 |
| La$_2$O$_3$ | 0.20 | 1.00 | 0.50 | 0.50 | 1.00 | 1.00 | 1.00 | 1.00 | 1.00 | 1.00 | 3.00 | 5.00 | 3.00 | 5.00 | 5.00 | 5.00 | 1.00 | 1.00 |
| WO$_3$ | 0.20 | — | — | — | — | — | — | — | — | — | — | — | — | — | — | — | — | — |
| MoO$_3$ | 0.20 | 1.00 | 0.50 | 0.50 | 0.50 | 0.50 | — | — | 0.50 | 0.50 | — | — | — | — | — | — | — | — |
| ZrO$_2$ | 0.50 | — | 1.00 | 0.50 | 0.50 | — | 0.50 | 0.50 | — | — | — | — | — | — | — | — | 0.50 | 0.50 |
| ZnO | — | — | — | 1.00 | 0.50 | — | — | — | 1.00 | — | — | — | — | — | — | — | 0.50 | 0.50 |
| SrO | 2.00 | — | 2.00 | 1.00 | — | — | 2.00 | 2.00 | — | — | — | — | — | — | — | — | — | — |
| TiO$_2$ | | | | | | | | | | | | | | | | | | |
| MoO$_3$ | | | | | | | | | | | | | | | | | | |
| V$_2$O$_3$ | | | | | | | | | | | | | | | | | | |
| MgO | | | | | | | | | | | | | | | | | | |
| Appearance in flow trial at 1100° C. | OP | V.S. | T | T | T | V.S. | V.S. | V.S. | S.O. | S.O. | T | OP | V.S.*,Δ | OP | OP | OP | T | T |
| Thermal Expansion ($\times 10^{-6}$/°C.) | — | 6.74 | 6.69 | — | — | — | — | — | — | — | — | — | — | — | — | — | — | — |

| Example No. | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|
| SiO$_2$ | 59.26 | 55.76 | 57.76 | 55.76 | 57.26 | 58.76 | 56.76 | 55.76 | 55.76 | 57.76 | 61.76 | 59.76 | 59.76 | 58.15 | 56.18 | 61.50 | 56.74 | 56.74 |
| Al$_2$O$_3$ | 11.33 | 11.33 | 11.33 | 13.33 | 13.33 | 13.33 | 13.33 | 13.33 | 13.33 | 13.33 | 11.33 | 11.33 | 13.33 | 11.22 | 11.22 | 11.00 | 10.49 | 10.49 |
| B$_2$O$_3$ | 9.22 | 11.22 | 9.22 | 9.22 | 9.22 | 9.22 | 9.22 | 7.22 | 7.22 | 7.22 | 7.22 | 7.22 | 7.22 | 13.58 | 11.11 | 10.00 | 13.17 | 13.17 |
| CaO | 7.12 | 7.12 | 7.12 | 7.12 | 7.12 | 7.12 | 7.12 | 9.12 | 9.12 | 9.12 | 7.12 | 9.12 | 7.12 | 2.10 | 6.06 | 6.00 | 6.59 | 6.59 |
| Na$_2$O | 4.08 | 4.08 | 4.08 | 4.08 | 4.08 | 4.08 | 4.08 | 4.08 | 4.08 | 4.08 | 4.08 | 4.08 | 4.08 | 4.04 | 5.03 | 3.00 | 5.63 | 5.63 |
| L$_2$O | 1.00 | 1.00 | 1.00 | 1.00 | 1.00 | 2.00 | 2.00 | 1.00 | 1.00 | 1.00 | 1.00 | 1.00 | 1.00 | 0.99 | 0.50 | 2.00 | — | — |
| Li$_2$O | 1.00 | 0.50 | 0.50 | 0.50 | 0.50 | 0.50 | 0.50 | 0.50 | 0.50 | 0.50 | 0.50 | 0.50 | 0.50 | 0.99 | 0.50 | 1.50 | — | — |
| Bi$_2$O$_3$ | 4.99 | 4.99 | 4.99 | 4.99 | 4.99 | 4.99 | 4.99 | 4.99 | 4.99 | 4.99 | 4.99 | 4.99 | 4.99 | 0.50 | 2.97 | 1.0 | 2.78 | 4.63 |
| La$_2$O$_3$ | 1.00 | 3.00 | 3.00 | 3.00 | 1.00 | 1.00 | 3.00 | 1.00 | 3.00 | 1.00 | 1.00 | 1.00 | 1.00 | 1.24 | 2.97 | 1.00 | 4.63 | 2.78 |
| WO$_3$ | — | — | — | — | — | — | — | — | — | — | — | — | — | 1.24 | 0.99 | — | — | — |
| MoO$_3$ | — | — | — | — | — | — | — | — | — | — | — | — | — | — | 0.50 | — | — | — |
| ZrO$_2$ | 0.50 | 0.50 | 0.50 | — | 0.50 | 0.50 | 0.50 | 0.50 | 0.50 | 0.50 | 0.50 | 0.50 | 0.50 | — | — | — | — | — |
| ZnO | 0.50 | 0.50 | 0.50 | — | 0.50 | 0.50 | 0.50 | 0.50 | 0.50 | 0.50 | 0.50 | 0.50 | 0.50 | 0.99 | 0.99 | — | — | — |
| SrO | — | — | — | — | — | — | — | — | — | — | — | — | — | 4.95 | 0.99 | 2.00 | — | — |
| TiO$_2$ | | | | | | | | | | | | | | | | | | |
| MoO$_3$ | | | | | | | | | | | | | | | | | | |

TABLE 3-continued

| Example No. | | | | | | | | | | | | | | | | | |
|---|---|---|---|---|---|---|---|---|---|---|---|---|---|---|---|---|---|
| $V_2O_3$ | | | | | | | | | | | | | | 1.00 | | | |
| MgO | | | | | | | | | | | | | | | | | |
| Appearance in flow trial at 1100° C. | T | T | T | T | T | T | T | T | T | T | S.O. | T | V.S,Δ | S.O. | OP | T | O.W. | OP |
| Thermal Expansion ($\times 10^{-6}$/°C.) | 7.37 | 8.03 | — | 7.06 | — | 7.06 | 7.77 | 7.49 | 7.46 | 7.31 | 7.03 | 7.49 | 6.89 | — | — | — | — | — |

| Example No. | 72 | 73 | 74 | 75 | 76 | 77 | 78 | 79 | 80 | 81 | 82 | 83 | 84 | 85 | 86 | 87 | 88 |
|---|---|---|---|---|---|---|---|---|---|---|---|---|---|---|---|---|---|
| $SiO_2$ | 58.89 | 57.50 | 57.24 | 57.50 | 57.77 | 30.00 | 50.25 | 60.25 | 65.37 | 54.90 | 68.01 | 59.01 | 50.00 | 45.00 | 61.01 | 65.00 | 61.10 |
| $Al_2O_3$ | 10.89 | 10.64 | 10.60 | 10.64 | 10.69 | 20.00 | 11.33 | 11.33 | 11.33 | 13.00 | 11.00 | 11.00 | 5.00 | 18.00 | 11.00 | 8.00 | 6.00 |
| $B_2O_3$ | 13.67 | 13.35 | 13.30 | 13.35 | 13.42 | 14.00 | 13.22 | 5.22 | 13.22 | 20.00 | 2.00 | 5.00 | 12.00 | 17.00 | 7.00 | 10.00 | 6.50 |
| CaO | 6.85 | 6.69 | 6.65 | 6.69 | 6.72 | 20.00 | 7.12 | 7.12 | 2.00 | 7.00 | 7.00 | 5.00 | 14.00 | 5.00 | 2.00 | — | 2.00 |
| $Na_2O$ | 5.85 | 5.71 | 5.68 | 5.71 | 5.74 | 8.00 | 6.08 | 4.08 | 6.08 | 4.00 | 6.00 | 4.00 | 4.00 | 6.00 | 5.00 | 1.00 | 1.00 |
| $L_2O$ | — | — | — | — | — | — | — | — | — | — | — | 4.00 | 2.00 | 2.00 | 3.00 | 1.00 | 6.00 |
| $Li_2O$ | — | — | — | — | — | — | — | — | — | — | — | 1.00 | 1.00 | — | 1.00 | 1.00 | 1.00 |
| $Bi_2O_3$ | 2.88 | 2.82 | 2.80 | 2.82 | 2.83 | 1.00 | 1.00 | 1.00 | 1.00 | 0.10 | 4.99 | 4.99 | 3.00 | 1.50 | 4.99 | 4.50 | 2.50 |
| $La_2O_3$ | — | 2.82 | 2.80 | 2.82 | 2.83 | 5.00 | 1.00 | 1.00 | 1.00 | 1.00 | 1.00 | 2.00 | 3.50 | 2.00 | 1.00 | 0.50 | 1.00 |
| $WO_3$ | — | — | — | — | — | — | — | — | — | — | — | — | — | 0.50 | 0.50 | 0.50 | — |
| $MoO_3$ | 0.96 | 0.47 | — | — | — | — | — | — | — | — | — | — | — | — | 0.50 | 0.50 | — |
| $ZrO_2$ | — | — | — | — | — | 2.00 | — | — | — | — | — | — | 0.50 | 1.50 | — | — | 5.00 |
| ZnO | — | — | — | — | — | — | — | 10.00 | — | — | — | 2.00 | 1.00 | — | 3.00 | 1.80 | 5.00 |
| SrO | — | — | — | — | — | — | — | — | — | — | — | — | 2.00 | — | — | 6.00 | 3.00 |
| $TiO_2$ | — | — | — | — | — | — | 10.00 | — | — | — | — | — | — | 0.50 | — | — | — |
| $MoO_3$ | | | | | | | | | | | | | | | | | |
| $V_2O_3$ | — | — | 0.93 | 0.47 | — | — | — | — | — | — | — | — | — | — | — | — | — |
| MgO | | | | — | — | — | — | — | — | — | — | 2.00 | 2.00 | 1.00 | — | 0.20 | — |
| Appearance in flow trial at 1100° C. | T | OP | OP | OP | OP | T | T | S.O. | S.O. | T | S.O. | T | OP | T | S.O. | S.O. | O.W. |
| Thermal Expansion ($\times 10^{-6}$/°C.) | — | — | — | — | — | — | — | — | — | — | — | — | — | — | — | — | — |

Some glaze slip was fired and melted in a ceramic mold using the standard 1100° C. firing cycle to form a glass bar.

Fragments of this bar were coarse ground using a pestle and mortar. Refractive index measurements were made on the resultant powder samples with an optical microscope using the standard Becke Line Oil immersion technique.

The results are shown in Table 4 below:

TABLE 4

| Glaze Composition | Refractive Index |
|---|---|
| 11 | 1.520 ± 0.005 |
| 13 | 1.530 ± 0.005 |
| 15 | 1.530 ± 0.005 |
| 16 | 1.530 ± 0.005 |
| 17 | 1.530 ± 0.005 |
| 54 | 1.525 ± 0.005 |
| 55 | 1.525 ± 0.005 |

I claim:

1. A glaze composition which is essentially free from lead and cadmium and which consists essentially of the following components:

| | |
|---|---|
| $SiO_2$ | 45 to 75% |
| $Bi_2O_3$ | 0.1 to below 5% |
| $Al_2O_3$ | 0.1 to 20% |
| $B_2O_3$ | 2 to 20% |
| at least one of CaO, MgO, SrO, BaO or ZnO | 2 to 22% |
| at least one of $Li_2O_3$, $Na_2O$, $K_2O$ | 1 to 10% |
| at least one of $La_2O_3$, $MoO_3$, $WO_3$ | 0.1 to 10% |
| $TiO_2$ | 0 to 10% |
| $ZrO_2$ | 0 to 10% |
| $P_2O_5$ | 0 to 5% |
| $V_2O_5$ | 0 to 1% | all percentages being percentages by weight based on the total weight of the glaze composition, the glaze composition containing $La_2O_3$, $MoO_3$ and/or $WO_3$ in a total amount of up to 10% by weight, with the proviso that the amount of each of $WO_3$ and $MoO_3$ is less than 5% by weight, and with the proviso that BaO is not contained in an amount of more than 2% by weight, the glaze composition having a firing temperature of 950° C. to 1250° C., and having a coefficient of thermal expansion of 50 to $100 \times 10^{-7}$°C.

2. Glaze composition according to claim 1 which comprises from 1.0 to 4.5% by weight of $Bi_2O_3$.

3. Glaze composition according to claim 1 which comprises from 50 to 65% by weight of $SiO_2$.

4. Glaze composition according to claim 1 which comprises from 7 to 15% by weight of $Al_2O_3$.

5. Glaze composition according to claim 1 which comprises 0.1 to 2% by weight $MoO_3$.

6. Glaze composition according to claim 1 which comprises 0.1 to 2% by weight Of $WO_3$.

7. Glaze composition according to claim 1 which comprises 0.1 to 5% by weight of $La_2O_3$.

8. Glaze composition according to claim 1 which contains a total amount of $La_2O_3$, $MoO_3$ and $WO_3$ in the range of from 0.1 to 8.0% by weight.

9. Glaze composition according to claim 1 which comprises from 5 to 14% by weight of $B_2O_3$.

10. Glaze composition according to claim 1 which has a refractive index of at least 1.45.

11. Glaze as claimed in claim 1 which additionally contains a pigment.

12. A method of glazing a ceramic body, which method comprises coating a ceramic body with a glaze composition according to claim 1 and firing the coated ceramic body at a glazing temperature of 950° to 1250° C.

13. Method according to claim 13 wherein the ceramic body is selected from the group consisting of ceramic table and whiteware including bone china, fine china, vitreous and earthenware.

14. Method according to claim 13 wherein the ceramic body is coated by a method selected from the group consisting of dipping and spraying.

* * * * *